(12) United States Patent
Ciavaglia et al.

(10) Patent No.: US 7,787,461 B2
(45) Date of Patent: Aug. 31, 2010

(54) SYSTEM AND A METHOD FOR PROCESSING FIELD FRAMES FOR MULTIPROTOCOL USE IN A COMMUNICATIONS NETWORK

(75) Inventors: Laurent Ciavaglia, Fontainebleau (FR); Emmanuel Dotaro, Verrieres le Buisson (FR)

(73) Assignee: Alcatel, Paris (FR)

( * ) Notice: Subject to any disclaimer, the term of this patent is extended or adjusted under 35 U.S.C. 154(b) by 1122 days.

(21) Appl. No.: 11/073,573

(22) Filed: Mar. 8, 2005

(65) Prior Publication Data

US 2005/0201417 A1 Sep. 15, 2005

(30) Foreign Application Priority Data

Mar. 9, 2004 (FR) ................................ 04 50472

(51) Int. Cl.
*H04L 12/28* (2006.01)
(52) U.S. Cl. ...................................... 370/392; 370/474
(58) Field of Classification Search ........................ None
See application file for complete search history.

(56) References Cited

U.S. PATENT DOCUMENTS

| | | | |
|---|---|---|---|
| 7,043,250 B1* | 5/2006 | DeMartino | 455/445 |
| 7,050,423 B2* | 5/2006 | Schneider et al. | 370/352 |
| 7,266,295 B2* | 9/2007 | Ovadia et al. | 398/51 |
| 7,298,694 B2* | 11/2007 | Kamiya et al. | 370/218 |
| 7,486,679 B2* | 2/2009 | Vigoureux et al. | 370/395.21 |
| 2002/0138628 A1* | 9/2002 | Tingley et al. | 709/227 |
| 2002/0167898 A1 | 11/2002 | Thang et al. | |
| 2004/0170173 A1* | 9/2004 | Pan et al. | 370/392 |
| 2005/0008014 A1* | 1/2005 | Mitra et al. | 370/392 |
| 2005/0013297 A1* | 1/2005 | Eriksson | 370/392 |
| 2005/0169279 A1* | 8/2005 | Magd et al. | 370/395.5 |
| 2007/0263661 A1* | 11/2007 | DeMartino | 370/474 |
| 2008/0219172 A1* | 9/2008 | Mohan et al. | 370/241.1 |
| 2008/0310417 A1* | 12/2008 | Friskney et al. | 370/392 |
| 2009/0034971 A1* | 2/2009 | Sadanada | 398/49 |

OTHER PUBLICATIONS

J. Reynolds et al. : "RFC 1700: Assigned Numbers" IETF RFC Publication, pp. 1, 16, 54, 168-171, 176-178, 'Online! Oct. 1994, XP002302087.
E. Rosen et al.: "RFC 3031: Multiprotocol Label Switching Architecture (MPLS)" RFC-Publication, 'Online! Jan. 2001, pp. 1-11, XP002302088.

* cited by examiner

*Primary Examiner*—Jayanti K Patel
*Assistant Examiner*—Hooman Houshmand
(74) *Attorney, Agent, or Firm*—Sughrue Mion, PLLC

(57) ABSTRACT

A system is dedicated to processing data frames for a communications network that supports one or more communications protocols. The system includes, firstly, a detection module adapted, on receipt of a data frame, to determine, from a plurality of sets of predefined values corresponding to respective different forms of protocol processing, the set containing a value taken by a selected frame field contained in the received frame and used by the protocol, and, secondly, a processing module adapted to determine a specific form of protocol processing corresponding to the set determined by the detection module and to be applied to the received frame.

24 Claims, 1 Drawing Sheet

Figure 1:
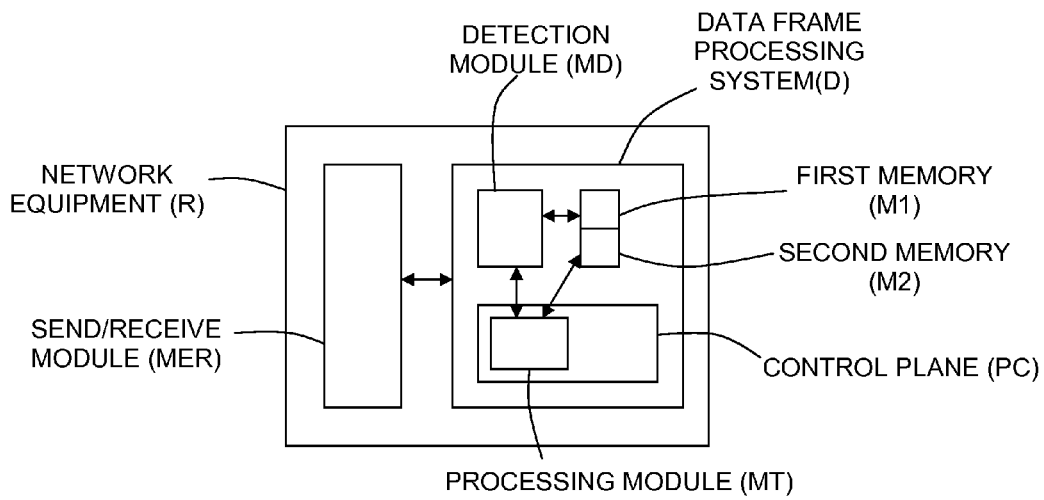

| DA 6 bytes | DS 6 bytes | VLAN TAG/G-label 4 bytes | Type 2 bytes | DATA 46-1500 bytes | PADDING ... | FCS 4 bytes |
|---|---|---|---|---|---|---|

NTE

SYSTEM AND A METHOD FOR PROCESSING FIELD FRAMES FOR MULTIPROTOCOL USE IN A COMMUNICATIONS NETWORK

The invention relates to the field of communications networks, and to be more precise to processing data frames in such networks.

As the person skilled in the art is aware, a number of techniques enable networks using different communications protocols to exchange data contained in frames and to offer services. These techniques include in particular encapsulation, which enables different networks to communicate with each other, and conversion (also known as matching), which enables networks to offer services offered by other networks.

The techniques that have been used to add new features or protocol functions tend to add or stack the field frames specific to each protocol one on top of the other. This requires certain modifications to the standard implementation of the protocols. One consequence of using the above techniques is that control information is duplicated in each protocol data unit (PDU), which generates a significant overhead, creates obstacles to the "interworking" (or "interoperability") of network equipments and/or network interconnectivity, and makes frame management more complex.

An object of the invention is therefore to improve on this situation.

To this end the invention proposes a data frame processing system for use in a communications network that supports one or more communications protocols, which system is characterized in that it comprises detection means adapted, on receipt of a data frame, to determine, from a plurality of sets of predefined values corresponding to respective different forms of protocol processing, the set containing a value taken by a selected frame field contained in said received frame and used by said protocol, and processing means adapted to determine a specific form of protocol processing corresponding to said set determined by said detection means and to be applied to said received frame.

The processing means are preferably adapted to instruct the application to said received frame of the specific form of protocol processing corresponding to the determined set.

If the processing means are able to access a first table listing the correspondences between set of value identifiers and forms of protocol processing, they may be adapted to determine a form of protocol processing corresponding to a set of values determined by said detection means. Similarly, if the processing means are able to access a second table listing the correspondences between forms of protocol processing and specific protocol values, they may be adapted to instruct the substitution in the received frame of a protocol value dedicated to said determined specific form of processing for the value of its selected frame field.

The system may comprise a first memory accessible to said detection means in which said sets of values are stored. It may also comprise a second memory accessible to said processing means in which said first and/or second correspondence tables are stored.

The detection means may be adapted to modify the values defining one or more of said sets as a function of instructions received, for example from a control plane of the network, whose processing means constitute at least a portion of the control plane.

The network protocol may be a "Level 2" protocol, for example. In this case, it may be an Ethernet protocol and its selected frame field may be the "Ethernet VLAN Tag" field. However, it may instead be a framing/encapsulation protocol, for example the GFP.

It is particularly advantageous if one or more of the sets of values are dedicated to forms of processing specific to another protocol or service different from that supported by the network, for example GMPLS, L2-LSP and developments and variants thereof. For example, the processing means may be adapted to instruct substitution of the value of the GMPLS label field for the value of the "Ethernet VLAN Tag" field.

The invention also proposes a network equipment equipped with at least a portion of a frame processing system of the type described above.

The invention further proposes a data frame processing method for a communications network that supports one or more communications protocols, which method consists, firstly, in selecting a field frame used by the protocol in data frames, secondly, associating with the selected frame field sets of values corresponding to different forms of protocol processing, and, thirdly, on receipt of a data frame, determining the set containing a value that is contained in its selected frame field, in order to determine the specific form of protocol processing corresponding to the set determined in this way and to be applied to the received frame.

Figure 2:
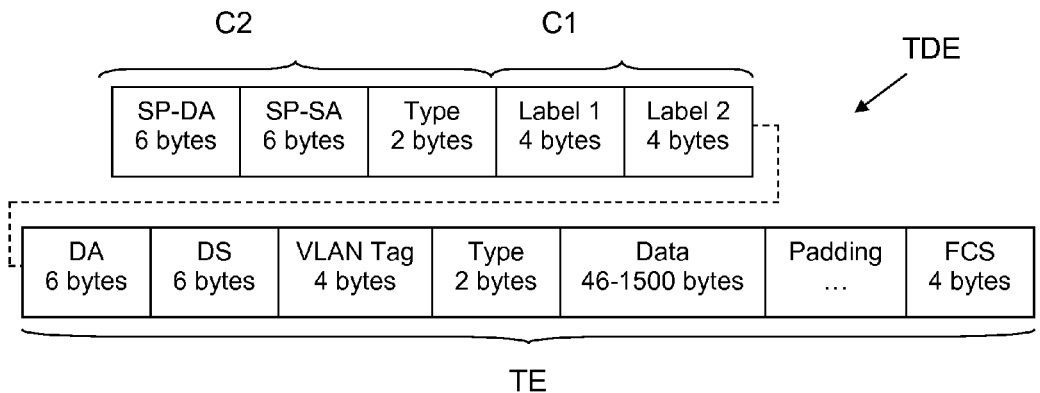
Figure 3:
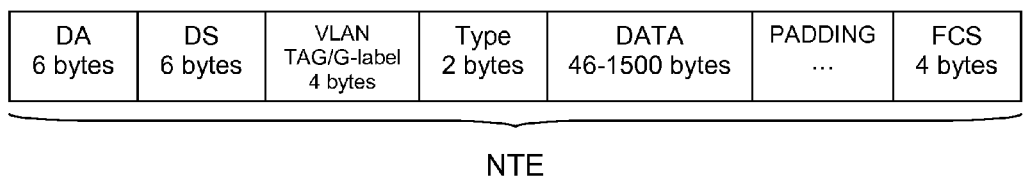

Other features and advantages of the invention will become apparent on reading the following detailed description and examining the appended drawings, in which:

FIG. 1 is a diagram of a router equipped with one embodiment of a distributed frame processing system of the invention, FIG. 2 is a diagram of one example of a standard dual-encapsulation data frame, and FIG. 3 is a diagram of one example of data frame of the invention.

The appended drawings constitute part of the description of the invention and may contribute to the definition of the invention, if necessary.

An object of the invention is to enable the use of a protocol field to code information or a function, where applicable new information or a new function, that is necessary for a network to support a protocol or a service, where applicable a new protocol or a new service.

To this end the invention proposes to equip each communications network with one or more data frame processing systems D of the type shown in FIG. 1, for example.

The invention relates to any communications network in which data is transmitted in frame fields, and in particular to networks supporting a Level 2 technology protocol, for example Ethernet, ATM, FR and X.25 networks, and networks supporting the Generic Framing Procedure (GFP) protocol, also known as the G.7041 protocol, which is not a Level 2 (or "Layer 2") protocol, but a framing/encapsulation protocol.

Moreover, the invention may be implemented either in a centralized form or in a distributed form. In either case, systems D of the invention must be connected to or installed at least partly in network equipments (or nodes) R for routing or switching data frames in the network, for example routers or switches.

An Ethernet network connected to an Internet Protocol (IP) network is considered below by way of illustrative example.

Within the Ethernet network, the invention consists firstly in identifying (or selecting), from among the fields that constitute Ethernet protocol format data frames (to be more precise, one of the control fields of the protocol that constitute what the person skilled in the art knows as a protocol data unit (PDU)), the field that is used for a particular form of protocol processing for said Ethernet protocol.

The field that is identified is the "Ethernet VLAN Tag" field, for example, for defining virtual subnetworks within the same Ethernet domain and distinguishing the various subnetworks by means of an identifier called the "VLAN Tag".

The selected frame field is then associated with two or more sets of values (or, in the simplest case, two or more ranges of values) respectively corresponding to its native form of protocol processing (or a new substitute form of protocol processing) in the case of the Ethernet protocol and to a different form of protocol processing in the case of another protocol or service that the Ethernet network is to support or offer.

For example, the other protocol or service may be the GMPLS (Generalized MultiProtocol Label Switching) or L2-LSP (Layer 2—Label Switched Path) protocol or service. An L2-LSP service is a virtual circuit (or connection) supported by a GMPLS control plane and requiring a network infrastructure using a (quasi) Level 2 technology.

For example, the first set of values corresponds to the values that the Ethernet VLAN Tag field may take and the second set of values corresponds to the values that the GMPLS label field may take according to the GMPLS protocol.

When the sets have been defined, they are stored in a memory M1 of the system D. This can of course be either a dedicated memory or a memory space reserved for this purpose in a memory shared between a plurality of functions.

To this end, the system D comprises detection means, preferably in the form of detection modules MD, installed in each node R of the Ethernet network. Each detection module MD observes each frame reaching the send/receive module MER of the node R in which it is installed in order to determine the value of its selected frame field (here the "Ethernet VLAN Tag" field). When the value has been determined, the detection module MD accesses the memory M1 to determine the set of values to which it belongs.

The system D further comprises processing means that may be either centralized in network management equipment or distributed in the form of processing modules MT between all the nodes R comprising a detection module MD, as shown in FIG. 1.

In other words, the Ethernet network can comprise either a system D distributed between the nodes R (detection modules MD) and in a management equipment (processing module MT) or a multiplicity of systems D comprising both a detection module MD and a processing module MT and each installed in a node R to process received frames locally, as in the example shown in FIG. 1.

When each node R is equipped with a complete system D, the processing module MT determines the specific form of protocol processing that corresponds to the set that has been determined by the associated detection module MD and that must be applied to the received frame. To this end, the system D preferably comprises a memory (or a reserved memory space) M2 coupled to the processing module MT in which is stored a first table of the correspondences between the identifiers of the sets of values (stored in the memory M1) and the associated forms of protocol processing.

Certain of these forms of protocol processing, possibly from another table, may correspond to dedicated protocol values intended to replace a selected frame field value contained in a received frame. For example, a form of protocol processing corresponding to a set of values may use the processing module MT to determine, in a table of labels of the node R, the LSP identifier that identifies the LSP connection with the next node along the path of the received frame.

It is advantageous for each system D to have its own table of labels, since the labels frequently have a local and/or temporary meaning associated with two nodes of the network. As a result, in two distant nodes, the same set of values may correspond to the same protocol processing, but with different protocol values (LSP identifiers).

When the network comprises only one centralized processing module MT, said module determines the specific form of protocol processing that corresponds to the set that has been determined by one of the detection modules MD installed in one of the routers R that it supervises and that must be applied to the frame that that router R has received. The form of protocol processing is determined in the way described above except that the memory M2 that contains the set identifier/ protocol processing correspondence table is preferably stored in the management server in which the processing module MT is installed. It is more convenient for the management server to have access to the memory MT, but this is not obligatory. The centralized processing module MT can recover the values stored in the memory M2 at the same time as the information on the received frame to be processed.

Each detection module MD is preferably adapted to substitute values that define at least one of the sets that it detects in the memory M1 associated with it. It may also be adapted to add a new set of values to the associated memory M1. This substitution or addition is effected as a function of instructions that are preferably received from the network control plane PC, which is either centralized, for example in a management server, or distributed between the nodes R, as shown in FIG. 1.

It is important to note that a distributed control plane PC may constitute an integral part of a system D, as shown here, or that a distributed processing module MT may instead constitute the whole or a portion of a distributed control plane PC.

Each processing module MT is preferably adapted to substitute the form of protocol processing that is associated with at least one of its sets in the associated memory M2. It may also be adapted to add to the associated memory M2 a form of protocol processing that is associated with a new set. This substitution or addition is effected as a function of instructions received, preferably instructions received from the network control plane PC, as described above.

The contents of the memories M1 and M2 can be updated dynamically and periodically or each time that the network operator decides on a modification.

Thanks to the invention, the semantics of a selected portion of the PDU of a frame can now be changed as a function of its value. Thus a node R can manage a plurality of different protocols and/or services over the same interface, at the same time (packet after packet), and using a single host protocol. The infrastructure of a network, for example an Ethernet network, therefore does not need to be modified to enable said network to support one or more other protocols and/or new services other than that or those for which it was originally designed, with the exception of the processing means, which must be adapted to the new form of protocol processing envisaged (for example, it must be capable of managing GMPLS labels (or G-labels)). In particular, the host protocol of the network does not need to be modified or adapted, since only the form of protocol processing for one or more of the control fields is changed in accordance with the configuration of the control plane PC, which is transparent to low-level functions.

The difference between a prior art data frame and a data frame of the invention is explained next by means of a comparison and with reference to FIGS. 2 and 3.

FIG. 2 shows one example of prior art data frames TDE for transporting data in an Ethernet network, in the case of IP/MPLS dual encapsulation. To be more precise, the Ethernet frame TE containing the data to be transported is encapsulated by means of a first "capsule" C1 consisting of two MPLS control fields (Label 1 and Label 2, each comprising four bytes), itself encapsulated by means of a second "capsule" C2 consisting of three header fields of the Ethernet transport frame (SP-DA (destination address), SP-SA (source address) and Type, respectively consisting of six bytes, six bytes and two bytes).

The encapsulated Ethernet frame TE conventionally comprises a field DA of six bytes, a field SA of six bytes, a field VLAN Tag of four bytes, a field Type of two bytes, a data field comprising between 46 and 1500 bytes, a padding field in which the number of bytes varies according to the number of bytes in the data field, and an FCS field of four bytes.

In a network of the invention, the Ethernet frame TE is no longer dual encapsulated, because the VLAN Tag field can be used to convey the control information of a GMPLS label field, for example. Consequently, the FIG. 2 data frame TDE henceforth takes the form shown in FIG. 3, i.e. the form of a new Ethernet frame NTE in which the VLAN Tag field is used not only for its native function, which corresponds to a first set of values, but also for a GMPLS (L2-LSP) label, which corresponds to a second set of values.

Accordingly, when a node R of the Ethernet network receives an NTE frame, its system D (or the system D) analyses the content of the VLAN Tag field to determine if it designates its native function or GMPLS label protocol processing. When this has been determined, the node R can apply the appropriate form of protocol processing to the received frame NTE.

The processing system D of the invention, and in particular its processing module MT and its detection module(s) MD, can take the form of electronic circuits, software or data processing modules, or a combination of circuits and software.

As mentioned above, the invention necessitates no addition to or modification of existing protocol standards, except for the GMPLS extensions needed to support L2-LSPs (this does not generate any management complexity).

Furthermore, because it eliminates duplication of control information, the invention greatly reduces the number of encapsulation control fields.

Moreover, the invention preserves the infrastructure, technology and protocol of a network, without modifying the standards.

Moreover, the invention enables at least dual operation, which authorizes the progressive introduction of new protocols and/or services both at the level of the nodes (card after card) and at the level of the network (node after node).

The invention also provides the benefits of the features of the GMPLS protocol in an Ethernet network, especially benefits in terms of routing, signaling, protection and traffic engineering.

Finally, the invention may readily be implemented by at least partially integrating it into the network process units (MPU) or into the processors, since only the processing of certain selected control fields is modified (semantics, internal format), and not the external format of the protocol data units (PDUs).

The invention is not limited to the embodiments of a processing system, a network equipment (or node) and a processing method described above by way of example only, but encompasses all variants that the person skilled in the art might envisage that fall within the scope of the following claims.

Thus there is described above an embodiment of the invention for a Level 2 protocol, such as the Ethernet protocol. However, the invention is not limited to this type of protocol alone. It applies equally to certain framing/encapsulation protocols, for example the GFP protocol. In this case, its selected frame field may be the channel identifier (CID) field, for example, which is responsible for defining one of the communication channels at the terminating points of GFP logical links, or a spare field that is free for use. For example, the CID field can be used to define a downcounter that is initialized to a relative address from a sender (or source) node and is used to determine, on reception of the GFP frame in a node, if that GFP frame has reached its final destination, and can therefore be removed from the transmission medium, or if said GFP frame is addressed to a node further down the communication link.

The invention claimed is:

1. A data frame processing system (D) for a communications network that supports at least one Ethernet communications protocol using a data frame format including a virtual local area network (VLAN) identifier field, the system comprising:
   detection means (MD) adapted, on receipt of a data frame, to determine, from a plurality of sets of predefined values corresponding to respective different forms of protocol processing, the set containing a value taken by at least one VLAN identifier field of the received data frame, and
   processing means (MT) adapted to determine a specific form of protocol processing corresponding to said set determined by said detection means (MD) and to be applied to said received frame,
   wherein said specific form of protocol processing being processing specific to said Ethernet communications protocol for a first set of values, and processing specific to a Generalized Multiprotocol Label Switching (GMPLS) or Layer-2 Label Switched Path (L2-LSP) protocol for a second set of values.

2. A system according to claim 1, characterized in that said processing means (MT) are adapted to instruct the application to said received frame of the specific form of protocol processing corresponding to the determined set.

3. A system according to claim 1, characterized in that said processing means (MT) are adapted to access a first table of correspondences between set of value identifiers and forms of protocol processing in order to determine a form of protocol processing corresponding to a set of values determined by said detection means (MD).

4. A system according to claim 3, characterized in that it comprises a second memory (M2) accessible to said processing means (MT) in which said first and/or second correspondence tables are stored.

5. A system according to claim 3, characterized in that said protocol is a "Level 2" protocol,
   characterized in that said protocol is an Ethernet protocol and said selected frame field is an "Ethernet VLAN Tag" field, and
   further characterized in that said processing means (MT) are adapted to instruct substitution of the value of a GMPLS label field for the value of the "Ethernet VLAN Tag" field.

6. A system according to claim 1, characterized in that said processing means (MT) are adapted to access a second table of correspondences between forms of protocol processing and specific protocol values to instruct the substitution of a protocol value dedicated to said determined specific form of processing for the value of the selected frame field in the received frame.

7. A system according to claim 1, characterized in that it comprises a first memory (M1) accessible to said detection means (MD) in which said sets of values are stored.

8. A system according to claim 1, characterized in that said detection means (MD) are adapted to modify the values defining at least one of said sets as a function of instructions received.

9. A system according to claim 8, characterized in that said instructions come from a control plane (PC) of said network.

10. A system according to claim 9, characterized in that said processing means (MT) constitute at least a portion of said control plane (PC).

11. A system according to claim 1, characterized in that said processing specific to the Ethernet communications protocol corresponds to the native processing of the VLAN identifier field serving to define virtual sub-networks within the same Ethernet domain.

12. A system according to claim 11, characterized in that said processing specific to the GMPLS or L2-LSP protocol is processing in which the semantics of the VLAN identifier field is the semantics of a GMPLS label.

13. A system according to claim 1, characterized in that said processing specific to the GMPLS or L2-LSP protocol includes a routing service of the GMPLS protocol.

14. A system according to claim 13, characterized in that said processing specific to the GMPLS or L2-LSP protocol includes a signaling service of the GMPLS protocol.

15. A system according to claim 1, characterized in that said processing means (MT) are adapted to instruct substitution of the value of a GMPLS label field for the value of an "Ethernet VLAN Tag" field.

16. Network equipment (R) for a communications network that supports at least one communications protocol, which equipment is characterized in that it comprises at least a portion of a frame processing system (D) according to claim 1.

17. A system according to claim 1, wherein said detection means (MD) is also adapted to determine said set from a second received frame with different values and/or protocols than said data frame, and said processing means (MT) is also adapted to determine a specific form of protocol processing corresponding to said set determined by said detection means (MD) and to be applied to said second received frame.

18. A system according to claim 1, wherein said detection means (MD) is also adapted to determine said set from a second received frame with same values and/or protocols with said data frame, and said processing means (MT) is also adapted to determine a specific form of protocol processing corresponding to said set determined by said detection means (MD) and to be applied to said second received frame.

19. A system according to claim 1, wherein said data frame is received at an interface of a node of said communications network, wherein said detection means (MD) is also adapted to determine said set from a second data frame received at said interface, wherein a VLAN identifier field of the second received data frame contains different values than said data frame, and said processing means (MT) is also adapted to determine a specific form of protocol processing corresponding to said set determined by said detection means (MD) and to be applied to said second received data frame.

20. A data frame processing method for a communications network that supports at least one Ethernet communications protocol using a data frame format including a virtual local area network (VLAN) identifier field, which method is characterized in that it consists in: i) identifying said VLAN identifier field; ii) associating with said VLAN identifier field sets of values corresponding respectively to different forms of protocol processing; and iii) on receipt of a data frame, determining the set containing a value that is contained in at least its VLAN identifier field, in order to determine the specific form of protocol processing corresponding to the set determined in this way and to be applied to the received frame, said specific form of protocol processing being processing specific to said Ethernet communications protocol for a first set of values, and processing specific to a Generalized Multiprotocol Label Switching (GMPLS) or Layer-2 Label Switched Path (L2-LSP) protocol for a second set of values.

21. A method according to claim 20, characterized in that said processing specific to the Ethernet communications protocol corresponds to the native processing of the VLAN identifier field serving to define virtual sub-networks within the same Ethernet domain.

22. A method according to claim 20, characterized in that said processing specific to the GMPLS or L2-LSP protocol is processing in which the semantics of the VLAN identifier field is the semantics of a GMPLS label.

23. A method according to any one of claim 20, characterized in that said processing specific to the GMPLS or L2-LSP protocol includes a routing service of the GMPLS protocol.

24. A method according to claim 20, characterized in that said processing specific to the GMPLS or L2-LSP protocol includes a signaling service of the GMPLS protocol.

* * * * *